（12）United States Patent
Makley et al.

(10) Patent No.: US 8,892,911 B2
(45) Date of Patent: Nov. 18, 2014

(54) VARIABLE POWER SYSTEMS FOR COMPUTERS

(75) Inventors: Albert V. Makley, Morrisville, NC (US); Marc R. Pamley, Durham, NC (US); William F. Martin-Otto, Apex, NC (US); Daryl Cromer, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 916 days.

(21) Appl. No.: 12/415,008

(22) Filed: Mar. 31, 2009

(65) Prior Publication Data

US 2010/0250991 A1 Sep. 30, 2010

(51) Int. Cl.
*G06F 1/26* (2006.01)

(52) U.S. Cl.
CPC .................................. *G06F 1/26* (2013.01)
USPC ............................ 713/300; 713/310; 713/320

(58) Field of Classification Search
USPC .................................... 713/300, 310, 320
See application file for complete search history.

(56) References Cited

U.S. PATENT DOCUMENTS

| | | | |
|---|---|---|---|
| 7,888,815 B2 * | 2/2011 | Togare et al. | 307/17 |
| 7,908,495 B2 * | 3/2011 | Diab et al. | 713/300 |
| 2004/0150928 A1 * | 8/2004 | Goodfellow et al. | 361/90 |
| 2004/0255171 A1 * | 12/2004 | Zimmer et al. | 713/300 |
| 2005/0102539 A1 * | 5/2005 | Hepner et al. | 713/300 |
| 2007/0007823 A1 * | 1/2007 | Huang et al. | 307/52 |
| 2008/0104428 A1 * | 5/2008 | Naffziger et al. | 713/300 |
| 2009/0100275 A1 * | 4/2009 | Chang et al. | 713/300 |
| 2009/0113221 A1 * | 4/2009 | Holle et al. | 713/310 |
| 2009/0193276 A1 * | 7/2009 | Shetty et al. | 713/340 |
| 2009/0276641 A1 * | 11/2009 | Peng et al. | 713/300 |
| 2009/0313485 A1 * | 12/2009 | Huang | 713/300 |
| 2009/0327786 A1 * | 12/2009 | Carroll et al. | 713/340 |
| 2010/0037070 A1 * | 2/2010 | Brumley et al. | 713/300 |
| 2011/0131428 A1 * | 6/2011 | Diab et al. | 713/300 |

* cited by examiner

*Primary Examiner* — Paul Yanchus, III
*Assistant Examiner* — Zahid Choudhury
(74) *Attorney, Agent, or Firm* — Ference & Associates LLC

(57) ABSTRACT

Arrangements which provide a degree of flexible power allocation among multiple power rails in computer systems, in a manner to permit the sharing and exchange of power across multiple rails. The rails involved in such sharing could be of similar or dissimilar voltage. By way of an advantageous refinement, a "shopping cart" approach for system configuration is permitted, based on subsystem or component power capability.

19 Claims, 3 Drawing Sheets

VARIABLE POWER SYSTEMS FOR COMPUTERS

FIELD OF THE INVENTION

The present invention relates generally to power systems for computers.

BACKGROUND OF THE INVENTION

Currently, in the context of computer systems, power supply arrangements are rather rigidly configured. Particularly, power supply design tends to be very specific with regard to the allowable current in different rails, even among same-voltage rails. In other words, as computer power supply arrangements may typically have different-voltage rails (e.g., 12V, 5V and 3.3V), they may also have several rails of the same voltage (e.g., several 12V rails), and even rails of the same voltage may each be strictly dedicated to one function (e.g., the powering of one system component) or another.

Because of this rigidity, there is no hierarchy imparted to rail power sources that permits a free and flexible sharing of power among rails. This creates inefficiencies in terms of unused or underused power rail capacity. For instance, power rails designed for a given power consumption may be idle, or at least its use far from optimized, during certain operational configurations of a computer system.

The present inventors have recognized a compelling and growing need in connection with addressing and reducing the inefficiencies just described.

SUMMARY OF THE INVENTION

Generally, there are broadly contemplated herein, in accordance with at least one presently preferred embodiment of the present invention, arrangements which provide a degree of flexible power allocation among multiple power rails in a manner to permit the sharing and exchange of power across multiple rails. The rails involved in such sharing could be of similar or dissimilar voltage. By way of an advantageous refinement, a "shopping cart" approach for system configuration is permitted, based on subsystem or component power capability.

In summary, one aspect of the invention provides a method comprising: providing a physical computing device, the physical computing device comprising a main memory; providing a power supply to power the physical computing device; providing distribution rails to power components of the physical computing device; allocating current to distribution rails in accordance with a predetermined initial distribution of current, the predetermined initial distribution of current including a setpoint power demand of a component; ascertaining a revised power demand of the component, the revised power demand being different from the setpoint power demand; redistributing current from a first rail to a second rail responsive to the ascertaining of a revised power demand.

Another aspect of the invention provides an apparatus comprising: a physical computing device; the physical computing device comprising a main memory; a power supply which powers the physical computing device; distribution rails which power components of the physical computing device; an allocator which allocates current to the distribution rails in accordance with a predetermined initial distribution of current, the predetermined initial distribution of current including a setpoint power demand of a component; and a control arrangement which ascertains a revised power demand of the component, the revised power demand being different from the setpoint power demand; the allocator acting to redistribute current from a first one of the distribution rails to a second one of the distribution rails responsive to ascertaining of a revised power demand.

Furthermore, an additional aspect of the invention provides a program storage device readable by machine, tangibly embodying a program of instructions executable by the machine to perform a method comprising: providing a physical computing device, the physical computing device comprising a main memory; providing a power supply to power the physical computing device; providing distribution rails to power components of the physical computing device; allocating current to distribution rails in accordance with a predetermined initial distribution of current, the predetermined initial distribution of current including a setpoint power demand of a component; ascertaining a revised power demand of the component, the revised power demand being different from the setpoint power demand; redistributing current from a first rail to a second rail responsive to the ascertaining of a revised power demand.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
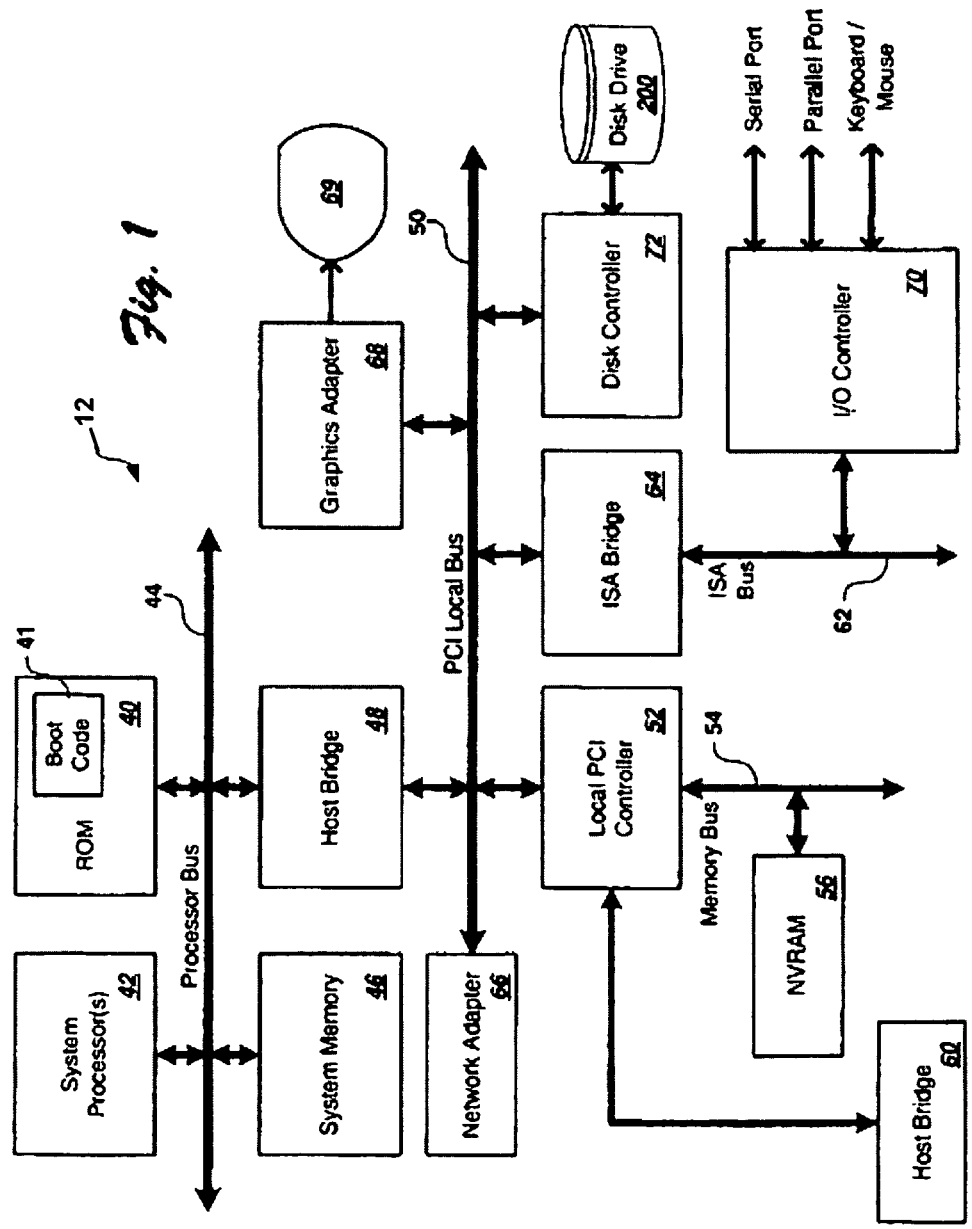
FIG. 1 schematically illustrates a computer system with added components.
Figure 2:
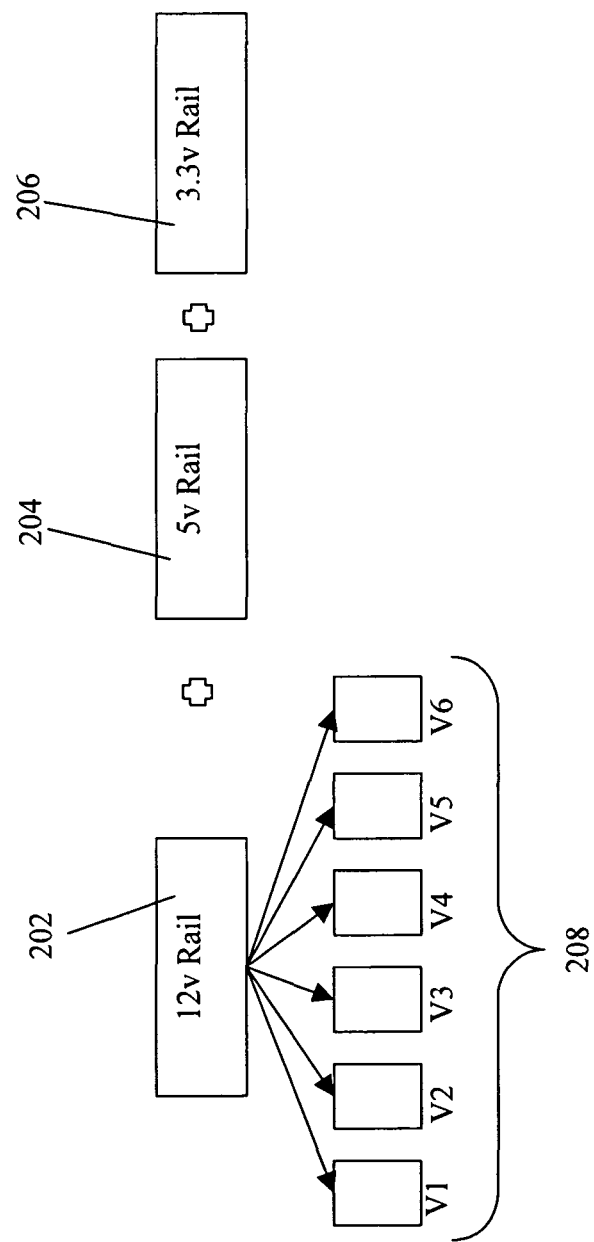
FIG. 2 schematically illustrates a conventional power supply arrangement.
Figure 3:
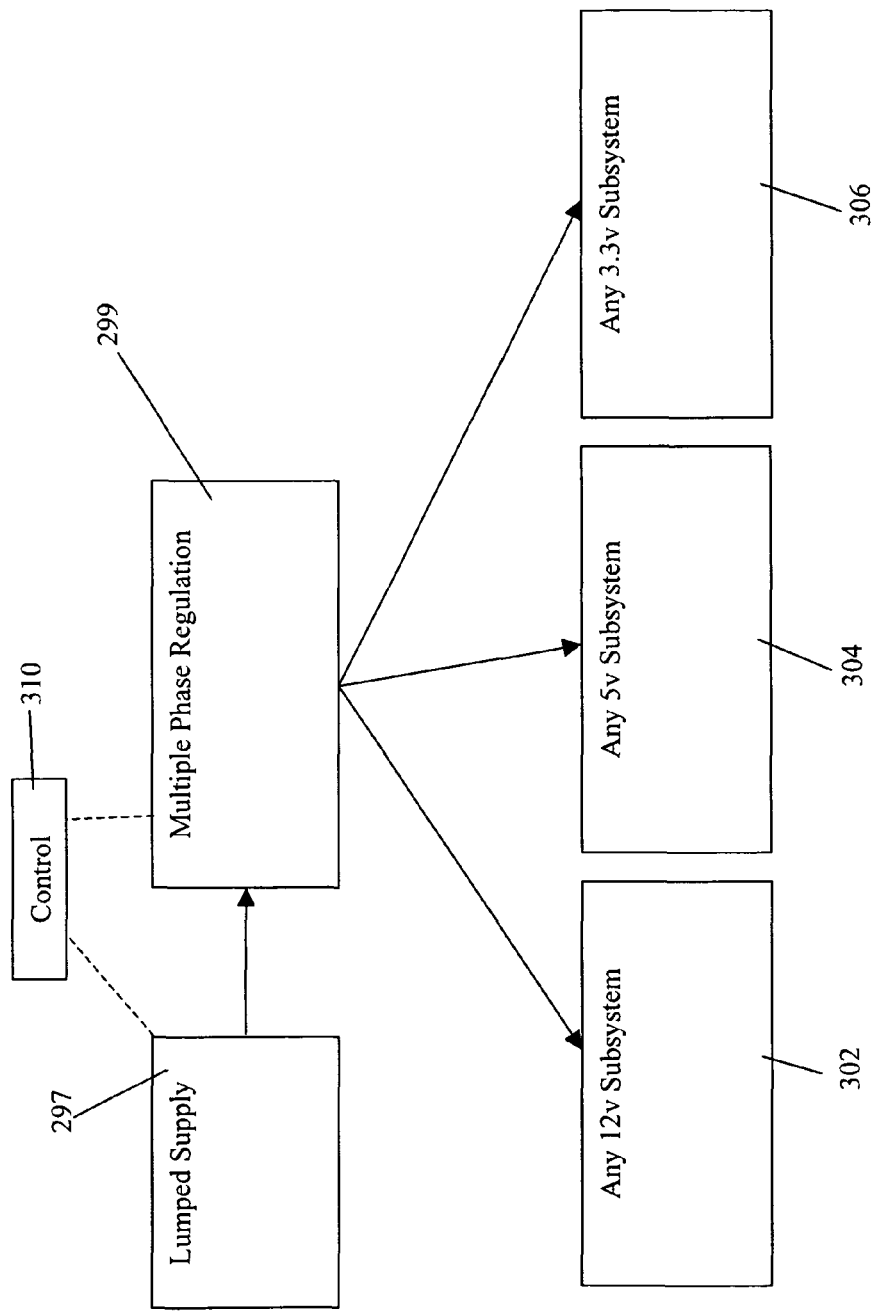
FIG. 3 schematically illustrates a flexible power supply arrangement in accordance with at least one preferred embodiment of the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, arrangements, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

It should be readily understood that FIG. 1 illustrates a computer system 12 that is provided here merely by way of illustrative and non-restrictive example. Of course, other types of computer systems can easily be employed within as a context of one or more embodiments of the present invention.

FIG. 2 schematically illustrates a conventional power supply arrangement. As is known, there may typically be provided three power rails for providing power to a computer system: a set (or subsystem) of one or more 12V rails (202), a set (or subsystem) of one or more 5V rails (204) and a set (or subsystem) of one or more 3.3V rails (206). The computer system so powered may be similar or analogous to that indicated at 12 in FIG. 1, or could be essentially any computer system utilizing similar power rails.

For the 12V set 202, several 12V rails 208 are shown (labeled as V1, V2, V3, V4, V5, and V6). Typically, each of these individual rails may power specific individual subsections of the computer system. For example, V1 may be used to power only a CPU, while V2 may be used to power only one other component (or set of components), and so on. This rigid structure, as described previously, thus can present inefficiencies in that one or more rails may be unused or underutilized in many cases where they have free capacity which could unburden another rail.

By contrast, FIG. 3 schematically illustrates a flexible power supply arrangement in accordance with at least one preferred embodiment of the present invention. As shown, a hierarchy may preferably be provided wherein a top level would be constituted by a lumped power source 297. As will now be appreciated, the lumped power source 297 distinguishes from conventional power sources in that, with the latter, an original power supply typically is split directly and inflexibly into individual voltages at individual rails immediately, wherein no sharing between the individual voltages/rails is possible (e.g., if one of the rails [with prescribed voltage] was consuming less than its rated capacity, it could not "lend" part of its capacity to another rail). Conventionally, rails of similar voltage (e.g., at 208 in FIG. 2) also do not lend capacity to each other once they have each received their rigidly defined allotment from an original power supply.

Power may then preferably be fed to a multiple phase regulation arrangement 299 which then flexibly distributes power among different subsystems, e.g., 12V, 5V and 3.3V subsystems 302/304/306 (and/or to specific rails within such subsystems). Such distribution can be based on immediate demand or on power requirements specific to the system. For instance, rails normally configured for one type of CPU (with a given power requirement or rating) can now be flexibly employed for another type of CPU (with a different power requirement or rating). As a specific, non-restrictive example, CPU-dedicated rails in the system of FIG. 3 may nominally be designed to power 130 W CPUs. However, if a user were to actually select or employ 2×80 W CPUs instead of 2×130 W CPUs, the excess capacity of 100 W (derived from 2×[130−80]) can now be reapportioned to another subsection of rails such as a nominal Gfx subsection of rails. This type of flexible reapportionment of power among rails can of course take a very wide variety of different forms, limited only by the power provided by the lump supply 297 and the capacities of the rails (at 302/304/306) themselves.

In an advantageous refinement in accordance with at least one presently preferred embodiment of the present invention, a "shopping cart" power matrix can be employed wherein a calculated array of subsystem power requirements are coupled together with a configuration selector. In such a setting, if one subsection of the computer system is determined to need to consume more power than nominally provided for by the existing configuration of power rails, then a different setup can freely and flexibly be configured in order to provide power to that subsection in accordance with available capacity in other rails. Conceivably, there is essentially no limit to the variety of configurations that can be manifested through the flexible power reapportionment broadly contemplated herein. Configuration selection can be brought about in essentially any suitable manner. For instance, a background component power matrix may be provided wherein a user preselects a configuration of system components to be utilized (e.g., CPUs, memory, hard disk drive, graphics, etc.). As components are successively selected, power may preferably be removed from the lumped supply and assigned to voltage rails, as appropriate.

Put another way, it should be understood that generally, in accordance with at least one presently preferred embodiment of the present invention, voltage rails (whether of same or different voltage) can readily obtain the power they require from a lumped source. The rails or sets of rails may be configured to deliver maximum output based on prospective power needs for a variety of different computer systems, while solely the lumped source need be limited in the power it provides. Customers essentially may pick and choose "building blocks" for whatever configuration is desired (wherein "building blocks" can be thought of as individual system components such as CPUs, memory, hard disk drive, graphics, etc.) and, based on the power consumption of each "building block", several may be chosen until the maximum power rating of the lumped power supply is met.

Control of the lumped power supply 297 and multiple phase regulation 299 can be undertaken via essentially any suitable control arrangement 310; by way of example, a dedicated microprocessor could assume such control, but the system processor itself (e.g., 42 in FIG. 1) could conceivably perform the same function.

It is to be understood that the present invention, in accordance with at least one presently preferred embodiment, includes elements and arrangements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
providing a physical computing device, the physical computing device comprising a main memory;
providing a lumped power supply to power the physical computing device;
providing distribution rails to power components of the physical computing device;
providing a multiple phase regulator between the lumped power supply and the distribution rails;
allocating current to distribution rails in accordance with a predetermined initial distribution of current, the predetermined initial distribution of current including a setpoint power demand of a component;
ascertaining a revised power demand of the component, the revised power demand being different from the setpoint power demand; and
redistributing current from a first rail to a second rail responsive to said ascertaining of a revised power demand;
wherein said redistributing comprises employing the multiple phase regulator to allocate current from the lumped power supply to distribution rails.

2. The method according to claim 1, wherein said ascertaining comprises ascertaining a revised power rating of a component, the revised power rating being different from a setpoint power rating.

3. The method according to claim 2, wherein said ascertaining comprises ascertaining a change in power demanded by a component.

4. The method according to claim 1, wherein said providing of distribution rails comprises providing a plurality of distribution rails of different voltage.

5. The method according to claim 4, wherein said providing of distribution rails further comprises providing a plurality of distribution rails of similar voltage.

6. The method according to claim 1, wherein said providing of distribution rails comprises providing a plurality of distribution rails of similar voltage.

7. The method according to claim 1, wherein said providing of a lumped power supply comprises providing the lumped power supply common to the distribution rails, wherein a component powered by a distribution rail is a subsection of said physical computing device, and further wherein at least one subsection is a central processing unit.

8. The method according to claim 1, wherein said providing of distribution rails comprises providing a 12V distribution rail.

9. The method according to claim 8, wherein said providing of distribution rails further comprises providing a 5V distribution rail.

10. The method according to claim 9, wherein said providing of distribution rails further comprises providing a 3.3V distribution rail.

11. The method according to claim 8, wherein said providing of distribution rails further comprises providing a 3.3V distribution rail.

12. An apparatus comprising:
a physical computing device;
said physical computing device comprising a main memory;
a lumped power supply which powers said physical computing device;
distribution rails which power components of said physical computing device;
an allocator between the lumped power supply and the distribution rails which allocates current to said distribution rails in accordance with a predetermined initial distribution of current, the predetermined initial distribution of current including a setpoint power demand of a component; and
a control arrangement which ascertains a revised power demand of the component, the revised power demand being different from the setpoint power demand;
said allocator acting to redistribute current from a first one of said distribution rails to a second one of said distribution rails responsive to ascertaining of a revised power demand;

wherein said allocator comprises a multiple phase regulator that redistributes current from the lumped power supply to distribution rails.

13. The apparatus according to claim 12, wherein said control arrangement acts to ascertain a revised power rating of a component, the revised power rating being different from a setpoint power rating.

14. The apparatus according to claim 12, wherein said distribution rails comprise a plurality of distribution rails of different voltage.

15. The apparatus according to claim 12, wherein said distribution rails comprise providing a plurality of distribution rails of similar voltage.

16. The apparatus according to claim 12, wherein said lumped power supply is common to said distribution rails, wherein a component powered by a distribution rail is a subsection of said physical computing device, and further wherein at least one subsection is a central processing unit.

17. The apparatus according to claim 12, wherein said distribution rails comprise a 12V distribution rail.

18. The apparatus according to claim 12 wherein said distribution rails further comprise a 5V distribution rail and a 3.3V distribution rail.

19. A non-transitory program storage device readable by machine, tangibly embodying a program of instructions that when executed by the machine enable the machine to:
provide a lumped power supply to power a physical computing device comprising a main memory;
provide distribution rails to power components of the physical computing device;
allocate current to distribution rails in accordance with a predetermined initial distribution of current, the predetermined initial distribution of current including a setpoint power demand of a component;
ascertain a revised power demand of the component, the revised power demand being different from the setpoint power demand; and
redistribute current from a first rail to a second rail responsive to said ascertaining of a revised power demand;
wherein to redistribute comprises employing multiple phase regulation via a multiple phase regulator disposed between said lumped power supply and said distribution rails to allocate current from the lumped power supply to distribution rails.

* * * * *